United States Patent [19]
Daftari

[11] Patent Number: 5,574,943
[45] Date of Patent: Nov. 12, 1996

[54] GATE-A20 AND CPU RESET CIRCUIT FOR MIRCROPROCESSOR-BASED COMPUTER SYSTEM

[75] Inventor: Reza E. Daftari, Irvine, Calif.

[73] Assignee: AST Research, Inc., Irvine, Calif.

[21] Appl. No.: 353,513

[22] Filed: Dec. 9, 1994

[51] Int. Cl.$^6$ ..................................................... G06F 1/24
[52] U.S. Cl. ............................................................. 395/821
[58] Field of Search .................................... 395/821, 825, 395/500, 800

[56] References Cited

U.S. PATENT DOCUMENTS

| 5,226,122 | 7/1993 | Thayer et al. | 395/500 |
| 5,261,114 | 11/1993 | Raasch et al. | 395/800 |
| 5,283,889 | 2/1994 | DeLisle et al. | 395/500 |
| 5,291,585 | 3/1994 | Sato et al. | 395/800 |

Primary Examiner—Jack B. Harvey
Assistant Examiner—Xuong M. Chung-Trans
Attorney, Agent, or Firm—Knobbe, Martens, Olson & Bear

[57] ABSTRACT

A computer system includes a chipset which controls the gate-A20 signal and the CPU RESET signal in a conventional manner in response to commands from a system microprocessor. The computer system further includes a peripheral controller which is programmed to generate an alternative gate-A20 signal and an alternative CPU RESET signal when the peripheral controller has been commanded to override the corresponding signals from the chipset. Two signal selectors controlled by the peripheral controller select either the gate-A20 signal and the CPU RESET signal from the chipset or the alternative gate-A20 signal and the alternative CPU RESET signal from the peripheral controller as respective outputs to control operations of the computer system. The use of the alternative signals permits certain operations of the computer systems to be directly controlled by an application program without being intercepted by the operating system.

3 Claims, 3 Drawing Sheets

GATE-A20 AND CPU RESET CIRCUIT FOR MIRCROPROCESSOR-BASED COMPUTER SYSTEM

BACKGROUND OF THE INVENTION

1. Field of the Invention

The present invention relates to an Intel microprocessor-based computer system having a keyboard controller which generates gate-A20 and CPU RESET signals and further having control logic which generates the gate-A20 and CPU RESET signals in place of the signals generated by the keyboard controller. In particular, the present invention relates to a circuit which permits the control logic and the keyboard controller to both generate gate-A20 and CPU RESET signals for different operations of the computer system.

2. Description of the Related Art

Computer systems based upon the Intel microprocessor family which use the Microsoft DOS (disk operating system) operate in two modes referred to as "real mode" and "protected mode." The protected mode was developed when Intel expanded the addressing capabilities of the Intel 80286 microprocessor to be able to address more than 1 Megabyte (1,048,576 bytes) of memory. Prior to this expansion of the memory addressing capabilities, only 20 address bits were available to address memory. Thus, only address bits 0–19 were provided as outputs of the microprocessor. Many programs initially developed for systems using the earlier Intel microprocessors (e.g., the Intel 8088 microprocessor) relied on the absence of address bits above address bit 19. For example, some programs relied on the fact that when the memory addresses generated by the segment registers exceeded the addressing capability of the microprocessor, the addresses simply "wrapped around" to the lowest address. That is, address $100000_{HEX}$ is the same as address $00000_{HEX}$ in a 20-bit addressing system. Thus, when the new microprocessors having the additional address bits were developed, Intel also provided a real mode of operation in which the new microprocessors operated in a manner similar to the earlier microprocessors. As part of the real mode of operation, most computer systems block address bit 20 so that even if address bit 20 is activated by the microprocessor, address bit 20 is not provided to the memory system. Thus, the expected wrap around function is provided irrespective of the state of address bit 20.

In many of the first computer systems having real and protected modes, address bit 20 is controlled by a signal called gate-A20 (or gate20). Often, the gate-A20 signal was generated by a peripheral controller (e.g., a keyboard controller) which formed part of the overall computer system. The keyboard controller was frequently implemented as a microprocessor or microcontroller which monitored output signals from the system microprocessor (e.g., via a command output port $64_{HEX}$ and a data input/output port $60_{HEX}$, hereinafter referred to as "port 64" and "port 60") and which generated keyboard control signals. The keyboard controller also provided scan codes signals representing keystrokes which were input on input/output port 60. For example, one commonly used keyboard controller still in use is an Intel 8042 keyboard controller. The structure of the basic 8042 keyboard controller has often been implemented as the core logic of a more complex peripheral controller circuit. Generally, the keyboard controller was also used to control the CPU RESET signal (also sometimes referred to as the CPU RESTART signal) because the CPU RESET signal was used in connection with the switching between the real mode and protected mode of operation.

Because the keyboard controller was implemented as a microprocessor, it executed internal instructions to monitor and receive commands and to generate signals. These instructions required time to execute. Thus, as the system microprocessors became faster, the time required by the keyboard controller to execute the internal instructions necessary to activate the gate-A20 signal and the CPU RESET signals became intolerable. In particular, the system microprocessor had to be programmed with delays, or the like, to allow time for the keyboard controller to recognize the commands and to generate the gate-A20 signal the CPU RESET signals before the system microprocessor executed instructions that relied on the signals being active and changing the configuration of the computer system 100. The programming of delays or other accommodations for the slow operation of the keyboard controller is considered an unacceptable programming practice because the delay times vary with different processor operating speeds. Furthermore, if the two signals are used frequently, the cumulative delays caused by the slow response of the keyboard controller caused a noticeable degradation in the operation of some computer systems.

Because of the perceived problems caused by the control of the gate-A20 signal and the CPU RESET signal, other ways of compensating for the slow operation of the keyboard controller were developed. In particular, additional logic has been included in more recent computer systems which monitors the same outputs of the system microprocessor. In one exemplary system, the additional logic operated independently of the keyboard controller in response to commands output from the system microprocessor on a port $92_{HEX}$ (hereinafter "port 92"). The additional logic detects when commands are output on the port 92 to change the state of the gate-A20 signal or the CPU RESET signal, and the logic generates the two signals in place of the signals originally generated by the keyboard controller. Because the additional logic was implemented in hardware, the gate-A20 signal and the CPU RESET signal were generated much faster by the additional logic than they had been generated by the keyboard controller. Typically, because some application programs manipulated the keyboard controller directly to generate gate-A20 and CPU RESET, the keyboard controller continued to respond to the respective commands on port 64 to also generate the two signals.

An alternative apparatus described in U.S. Pat. No. 5,226,122 intercepts the keyboard controller signals on the output port 64, and, if the commands are directed to the control of either the gate-A20 signal or the CPU RESET signal, the apparatus blocks the commands from being received by the keyboard controller. Thus, the keyboard controller continues to operate as before, but the keyboard controller never receives the particular commands that manipulate the gate-A20 signal and the CPU RESET signal. Thus, the alternative apparatus generated the gate-A20 signal and the CPU RESET signal much faster than the keyboard controller would have generated the two signals.

In a further alternative, VLSI Technology developed a chipset which operates in response to both the port 92 commands and the port 64 commands directed to the generation of the gate-A20 signal and the CPU RESET signal. Thus, the VLSI Technology chipset is compatible with software which uses the port 64 commands through the keyboard controller to generate the two signals and is also compatible with software which uses the port 92 commands to control the two signals. Unlike the previously described apparatus, the VLSI Technology chipset does not block the port 64 commands to the keyboard controller. The keyboard controller continues to receive the port 64 commands from the system microprocessor and to generate the gate-A20 signal and the CPU RESET signal as before; however, the signal pins from the keyboard controller onto which the gate-A20 signal and the CPU RESET signal are output are not connected within the computer system. Thus, the gate-A20 signal and the CPU RESET signal are provided as outputs of the VLSI Technology chipset without the delay inherent in the keyboard controller and without any interference from the outputs of the keyboard controller.

It has been found however that there are situations where the gate-A20 signal and the CPU RESET signal generated by the keyboard controller are useful. For example, because the gate-A20 signal controls the ability to toggle address bit 20, it is necessary to be able to control the gate-A20 signal to enable memory accesses to locations having addresses above 1 Megabyte. In one particular example, certain computer systems, such as those produced by AST Research, Inc., the assignee of the present application, have FLASH BIOS which can be downloaded from a network, or the like. The FLASH BIOS is a non-volatile, writable memory that is accessed when the computer system is first booted when powered up or when re-booted in response to a reset. The software which downloads the FLASH BIOS from the network requires control of the gate-A20 signal to access memory above 1 Megabyte and requires control of the CPU RESET signal to initiate a restart of the system microprocessor after the downloading operation is complete; however, in conventional computer systems having the improved control logic discussed above, the gate-A20 signal and CPU RESET signal are strictly controlled by the operating system in accordance with the current mode of operation of the computer system (i.e., real mode or protected mode). In particular, operating systems, such as Windows NT and OS/2 monitor and trap outputs to port 92 or to port 64 which are directed to the manipulation of the gate-A20 signal or the CPU RESET signal. Attempts by an application program to manipulate one of the two signals via either output port result in errors which could result in the termination of the program attempting to manipulate either signal. Thus, a need exists for a system that permits the gate-A20 signal and the CPU RESET signal to be manipulated irrespective of the mode of the computer system so that operations which depend upon manipulation of the two signals, such as downloading of the FLASH BIOS, can be accomplished without resulting in system errors.

SUMMARY OF THE INVENTION

The present invention provides a system that manipulates the gate-A20 signal and the CPU RESET signal independently of the conventional manipulation of the two signals by system logic. The present invention provides circuitry which monitors output signals from the system microprocessor and determines when the output signals are directed to the manipulation of the gate-A20 signal or the CPU RESET signal by commands other than the conventional system commands. The present system includes circuitry which disables the outputs of the conventional system control logic and which enables the outputs of the logic added by the present invention to thereby enable the added logic to manipulate the gate-A20 signal and the CPU RESET signal. Preferably, the added logic is implemented as part of a keyboard controller and uses the output pins of the keyboard controller previously disabled by the conventional VLSI Technology controller.

One aspect of the present invention is a signal generation system which controls the generation of a gate-A20 signal and a CPU RESET signal in a computer system having a system microprocessor. The signal generation system comprises a first circuit which generates a conventional gate-A20 signal and a conventional CPU RESET signal in response to conventional commands from the system microprocessor. The signal generation system further comprises a peripheral controller which monitors commands from the system microprocessor and which responds to predetermined commands to generate an alternative gate-A20 signal and an alternative CPU RESET signal in response to the predetermined commands. The peripheral controller is further responsive to commands to generate a select signal having first and second states. A select circuit is included which has a first set of inputs which receive the conventional gate-A20 signal and the conventional CPU RESET signal from the first circuit and which has a second set of inputs which receive the alternative gate-A20 signal and the alternative CPU RESET signal from the peripheral controller. The select circuit receives the select signal from the peripheral controller and responds to the select signal to provide the conventional gate-A20 signal and the conventional CPU RESET signal as outputs to the computer system when the select signal has the first state and to provide the alternative gate-A20 signal and the alternative CPU RESET signal as outputs to the computer system when the select signal has the second state.

DETAILED DESCRIPTION OF THE PREFERRED EMBODIMENT

Figure 1:
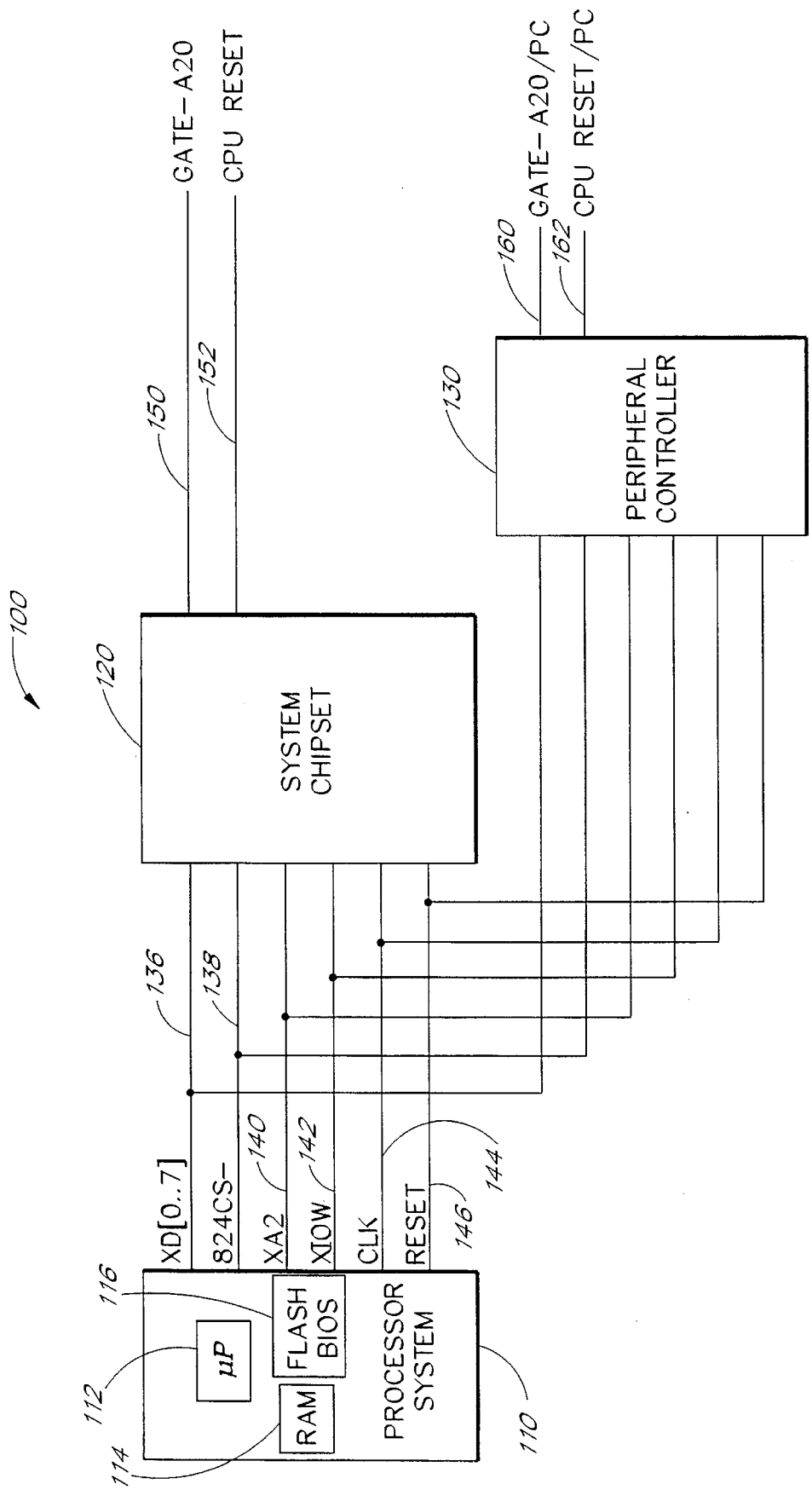
FIG. 1 illustrates a conventional microprocessor-based computer system into which the preset/invention may be advantageously incorporated.

FIG. 1 illustrates a block diagram of a conventional microprocessor-based computer system 100 into which the present invention may be advantageously incorporated. As illustrated in FIG. 1, the computer system 100 includes a processor subsystem 110 which includes a system microprocessor 112, such as the Intel Pentium processor, or the like. The system microprocessor 112 accesses data from a RAM 114 and from a FLASH BIOS 116. Additional supporting resources (not shown) are included within the processor subsystem 110. The processor subsystem 110 is connected to numerous components; however, only the components relevant to the present invention are illustrated in FIG. 1. In particular, the processor subsystem 110 is coupled to a system chipset 120 and to a peripheral controller 130 via a plurality of signal lines and buses, including a conventional host data bus (XD[0 . . . 7]) 136, a conventional keyboard controller chip select (8242CS−) signal line 138, a conventional address 2 (XA2) signal line 140, a conventional I/O write (XIOW− ) signal line 142, a conventional clock (CLK) signal line 144 and a conventional RESET− signal line 146. (Note: as used herein, a signal name ending with a hyphen or minus sign "−") is an active low signal.)

The system chipset 120 may be, for example, a Model No. VL82C593 available from VLSI Technology. The system chipset 120 implements a number of functions within the computer system 100. The implemented functions include the generation of the gate-A20 signal and the CPU RESET signal on a gate-A20 output line 150 and a CPU RESET output line 152, respectively. Because the system chipset 120 is preferably constructed from programmable gate arrays rather than being microprocessor based, the gate-A20 signal and the CPU RESET signal are generated with minimal delay between the activation of the appropriate command signals on the outputs of the processor subsystem 110 and the activation of the output signals from the chipset 120. Thus, the software which drives the processor subsystem 110 can be programmed with no delays because it can be safely assumed that when the port 92 commands to generate the gate-A20 signal or the CPU RESET signal are executed, the signals will be generated by the chipset 120 within one or two clock cycles.

As discussed above, the peripheral controller 130 is programmed to generate a gate-A20/PC signal on a line 160 and the CPU RESET/PC signal on a line 162 in response to the particular commands on the port 92. (The "/PC" after each of the two signal names is used to distinguish the output signal from the peripheral controller 130 from the corresponding output signal from the chipset 120.) In order to prevent the delayed signals from having an effect on the operation of the computer system 100, the gate-A20/PC signal line 160 and the CPU RESET/PC signal line 162 from the peripheral controller 130 are not connected to the computer system 100. Thus, a conventional peripheral controller 130 can be used in combination with the VLSI Technology chipset 120 without the signals from the peripheral controller 130 interfering with the corresponding signals from the chipset 120.

The foregoing solution to the previously described problem regarding the gate-A20 signal and the CPU RESET signal was adequate for conventional computer systems; however, it has been subsequently discovered that the exclusive control of the gate-A20 signal and the CPU RESET signal by the chipset 120 presented problems with certain application software that needs to manipulate one or both of the signals. For example, in the assignee's computer systems, the data for updating the FLASH BIOS 116 of the computer system 100 can be downloaded from a network or other data source to the RAM 114, and then transferred from the RAM 114 to the FLASH BIOS 116. In order to be able to transfer the downloaded data from the RAM 114 to the FLASH BIOS 116 in this manner, it is necessary to be able to control the gate-A20 signal and the CPU RESET signal to control the memory addressing and to generate a warm restart of the system microprocessor 112 after the FLASH BIOS 116 has been updated. It is been found however that some operating systems, such as Windows NT, or the like, preclude access to the port 64 or to the port 92 with commands that control either the gate-A20 signal or the CPU RESET signal. In particular, attempts to generate either of the two signals via either the port 64 or the port 92 results in errors that interrupt the further operation of the software attempting the access. Thus, it was discovered that an alternative system for controlling the gate-A20 signal and the CPU RESET signal was needed.

Figure 2:
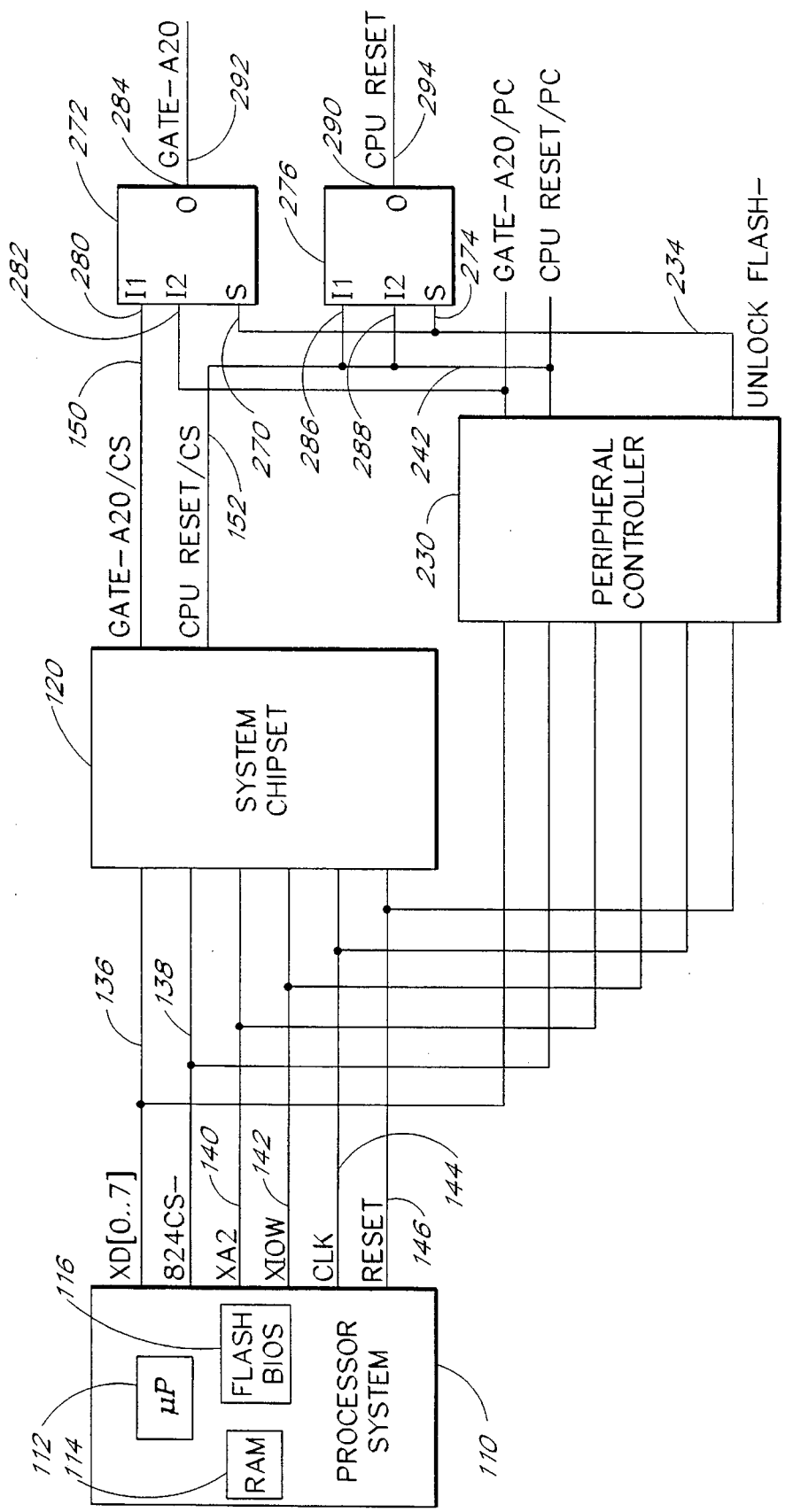
FIG. 2 illustrates a computer system similar to the computer system of FIG. 1, but which is modified in accordance with the present invention.

FIG. 2 illustrates a computer system 200 which is similar to the computer system 100 of FIG. 1, but which is modified in accordance with the present invention. In particular, in addition to the components of FIG. 1, the computer system 200 includes a modified peripheral controller 230 which is similar to the conventional peripheral controller 130 of FIG. 1. However, the modified peripheral controller 230 includes an UNLOCK FLASH– output signal on a previously unused output pin 232 connected to a signal line 234. The UNLOCK FLASH– output signal enables new data to be stored into the FLASH BIOS memory 116 by enabling a write enable signal (not shown). The UNLOCK FLASH– signal also enables alternative gate-A20/PC and CPU RESET/PC signals described below.

The modified peripheral controller 230 generates a gate-A20/PC on a line 240 and a CPU RESET/PC signal on a line 242. These two signals are similar to the gate-A20 signal and the CPU RESET signal generated by the conventional peripheral controller 130 of FIG. 1 and may advantageously be provided on the same output pins as before. However, as described below, the two signals are generated in a different manner and in response to different commands than in the conventional peripheral controller 130 of FIG. 1.

The UNLOCK FLASH– output signal, the gate-A20/PC and the CPU RESET/PC signals are generated in response to a previously unused commands on a port different from the port 92 or the port 64. For example, in one particularly preferred embodiment, the modified peripheral controller responds to the output of a command $3E_{HEX}$ on a port $D5_{HEX}$ (hereinafter "port D5") to initiate a sequence in which the peripheral controller 230 activates the UNLOCK FLASH– signal on the line 234, sets the gate-A20/PC signal off to allow the manipulation of address bit 20, and then generates the CPU RESET/PC signal to cause the system microprocessor 112 (FIG. 2) to be reset. Software instructions within the FLASH BIOS 116 of the system microprocessor 112 detects that the UNLOCK FLASH– signal has been activated (e.g., by monitoring a software flag, or the like) and executes a sequence of instructions that transfer the new BIOS data from RAM 114 to the FLASH BIOS 116. Thereafter, the system microprocessor 112 releases the UNLOCK FLASH– signal and then generates a conventional CPU RESET to re-boot the system microprocessor 112 using the newly downloaded BIOS instructions.

Because the UNLOCK FLASH– signal, the gate-A20/PC signal and CPU RESET/PC signal are generated in response to a command on the port D5 instead of on the port 64 or the port 92, the generation of this previously unused command by the system microprocessor 112 is not recognized by the operating system as an attempt to manipulate either the gate-A20 signal or the CPU RESET signal, and thus the selected command does not cause the operating system to generate an error. Furthermore, the chipset 120 is not responsive to this new command, and the chipset 120 therefore does not generate any output signals or other functions in response to the command.

As discussed above, the new command is not used on the conventional peripheral controller 130 of FIG. 1; however, the peripheral controller 230 is a programmable peripheral controller so that the software for the peripheral controller 230 can be modified, either in the manufacturing process for a ROM-based peripheral controller or by downloading new software to a RAM-based peripheral controller. The software causes the modified peripheral controller 230 to recognize the added port D5 command in a similar manner to the manner in which the conventional peripheral controller 130 in FIG. 1 recognizes the port 64 commands. The internal software causes the peripheral controller 230 to recognize the command on the port D5 and to activate the UNLOCK FLASH– signal on the line 234 and to generate the gate-A20/PC signal on the line 240 and to generate the CPU RESET/PC signal on the line 242 as part of the instruction sequence described above. It should be understood therefore that other commands on other command ports could also be used by suitable programming of the modified peripheral controller 230.

As further illustrated in FIG. 2, the UNLOCK FLASH– signal line 234 is connected to a select input terminal 270 of a first signal selector 272 and is also connected to a select input terminal 274 of a second signal selector 276. The first signal selector 270 has a first signal input terminal 280, a second signal input terminal 282 and a signal output terminal 284. The second signal selector 276 has a first signal input terminal 286, a second signal input terminal 288 and a signal output terminal 290. The output terminal 284 of the first signal selector 272 provides the gate-A20 signal as an output on a line 292. The output terminal 290 of the second signal selector 276 provides the CPU RESET signal as an output on a line 294. The two signal selectors may be, for example, 2-to-1 multiplexers in which the state of the UNLOCK FLASH– signal on the respective select input terminal causes the signal selectors to communicate one or the other of the signals on the two signal input terminals of a multiplexer to the respective signal output terminal.

The gate-A20 signal and the CPU RESET signal generated by the chipset 120 have been relabeled in FIG. 2 as gate-A20/CS and CPU RESET/CS, respectively to distinguish them from the outputs of the signal selectors 272 and 276. The gate-A20/CS signal on the line 150 is connected to the first signal input terminal 280 of the first signal selector 272. The CPU RESET/CS signal on the line 152 is connected to the first signal input terminal 284 of the second signal selector 276. The gate-A20/PC signal output from the peripheral controller 230 on the line 240 is connected to the first input terminal 286 of the second signal selector 276, and the CPU RESET/PC signal output from the peripheral controller 230 is connected to the second input terminal 288 of the second signal selector 276.

In operation, when the UNLOCK FLASH– signal is active (e.g., is in an active low logic state in the preferred embodiment), the first and second signal selectors 272, 276 switch their respective second input terminals to their respective output terminals so that the gate-A20/PC and CPU RESET/PC signals from the modified peripheral controller 230 are provided as the respective output signals to control the computer system 100. On the other hand, when the UNLOCK FLASH– signal is inactive (e.g., is in an inactive high logic state in the described embodiment), the first and second signal selectors switch their respective first input terminals to their respective output terminals so that the gate-A20/CS signal and the CPU RESET/CS signal from the chipset 120 are provided as the respective output signals to control the computer system 100. Thus, by manipulating the UNLOCK FLASH– signal on the line 234 via the peripheral controller 230, the application program can allow the operating system to control the gate-A20 signal and the CPU RESET signal in a conventional manner using the gate-A20/CS signal and the CPU RESET/CS signal from the chipset 120, or, in the alternative, the application program can directly control the gate-A20 signal and the CPU RESET signal using the gate-A20 signal and the CPU RESET signal from the peripheral controller 230. By using this alternative, the application program can control the memory addressing and control the restarting of the system microprocessor 112 such that the FLASH BIOS can be downloaded and other non-standard system operations can be performed.

Figure 3:
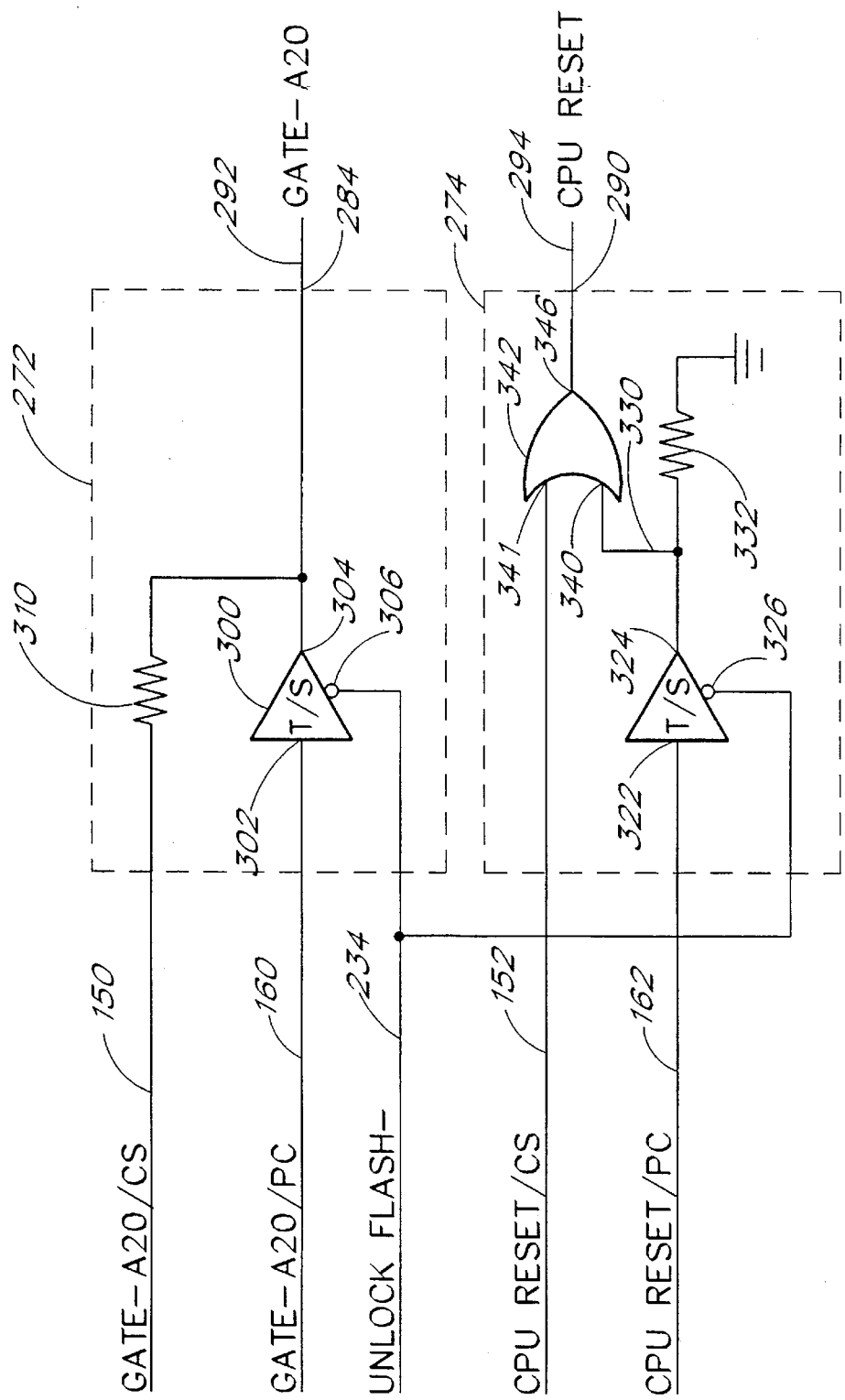
FIG. 3 illustrates preferred embodiments of the signal select circuits of FIG. 2.

Although described above as 2-to-1 multiplexers, the two signal selectors 272, 276 may be implemented as logic gates as illustrated in FIG. 3. In FIG. 3, the first signal selector 272 comprises a tri-state buffer gate 300 having an input terminal 302, an output terminal 304 and an active low enable input terminal 306. The output terminal 304 is connected to the gate-A20 signal line 292. The enable input terminal 306 is connected to the UNLOCK FLASH– signal line 234. The input terminal 302 is connected to the gate-A20/PC signal line 160. The gate-A20 signal line 292 and the output terminal 304 are also connected to a first terminal of a resistor 310. A second terminal of the resistor 310 is connected to the gate-A20/CS signal line 150 from the chipset 130. In one embodiment of the present invention, the resistor 310 has a resistance of approximately 4,700 ohms.

Whenever the active low enable input terminal 306 has a low logic level applied to it (i.e., when the UNLOCK FLASH– signal is active), the output terminal 304 of the tri-state gate 300 and thus the gate-A20 signal line 292 have the same signal level as the gate-A20/PC signal on the input terminal 302. Otherwise, when the enable input terminal 306 has a high logic level applied to it, the output terminal 304 effectively "floats" such that it does not affect the logic level on the gate-A20 signal line 292. When the output terminal 304 floats, the signal level on the gate-A20 signal line 292 will be substantially the same level as the gate-A20/CS signal on the line 150 as communicated through the resistor 310. The resistance of the resistor 310 is sufficiently low that the gate-A20 signal on the signal line 292 will track the gate-A20/CS signal on the signal line 150. On the other hand, the resistance is sufficiently high that when the tri-state gate 300 is active, the output signal on the output terminal 304 overrides the gate-A20/CS signal.

The second signal selector 274 could be constructed in a similar manner as the first signal selector 272; however, in the preferred embodiment, the second signal selector 274 is constructed as illustrated in FIG. 3 such that the CPU RESET/PC signal and the CPU RESET/CS signal are OR'ed together as described below. The signal selector 274 includes a tri-state gate 320 having an input terminal 322, an output terminal 324 and an enable input terminal 326 which operate as described above in connection with the tri-state gate 300. The enable input terminal 326 is connected to the UNLOCK FLASH– signal line 234. The input terminal 322 is connected to the CPU RESET/PC signal line 162. The output terminal 324 is connected to a signal line 330 which is also connected to a first terminal of a resistor 332 (e.g., a 4,700 ohm resistor) which has a second terminal connected to logic ground. When the UNLOCK FLASH– signal is active low, the signal line 330 will have a signal level that tracks the CPU RESET/PC signal on the signal line 162. When the UNLOCK FLASH– signal is inactive, the signal line 330 will be pulled to an inactive low logic level.

The signal line 330 is connected to a first input terminal 340 of an OR-gate 342. A second input terminal 344 of the OR-gate 342 is connected to the CPU RESET/CS signal line 152. An output terminal 346 of the OR-gate 342 is connected to the CPU RESET line 294. It can be seen that either an active high CPU RESET/CS signal on the signal line 152 or an active high signal on the line 330 will cause the output terminal 346 to be active high to cause the CPU RESET signal to be activated. Thus, the CPU RESET/CS signal from the chipset 130 remains enabled although the active UNLOCK FLASH– signal has also enabled the CPU RESET/PC signal. This allows the system microprocessor 112 to reset itself in a conventional manner after it has finished transferring the FLASH BIOS data from RAM to the FLASH BIOS memory.

Although this invention has been described in terms of a certain preferred embodiment, other embodiments apparent to those of ordinary skill in the art are also within the scope of this invention. Accordingly, the scope of the invention is intended to be limited by the following appended claims.

What is claimed is:

1. A signal generation system which controls the generation of a gate-A20 signal and a CPU RESET signal in a computer system having a system microprocessor, said signal generation system comprising:

a first circuit which generates a conventional gate-A20 signal and a conventional CPU RESET signal in response to conventional commands from the system microprocessor;

a peripheral controller which monitors commands from the system microprocessor and which responds to predetermined commands to generate an alternative gate-A20 signal and an alternative CPU RESET signal in response to said predetermined commands, said peripheral controller further responsive to commands to generate a select signal having first and second states; and a select circuit having a first set of inputs which receive said conventional gate-A20 signal and said conventional CPU RESET signal from said first circuit and having a second set of inputs which receive said alternative gate-A20 signal and said alternative CPU RESET signal from said peripheral controller, said select circuit receiving said select signal from said peripheral controller and responsive to said select signal to provide said conventional gate-A20 signal and said conventional CPU RESET signal as outputs to the computer system when said select signal has said first state and to provide said alternative gate-A20 signal and said alternative CPU RESET signal as outputs to the computer system when said select signal has said second state.

2. An apparatus which generates gate-A20 and CPU RESET in a microprocessor-based computer system, said apparatus comprising:

a circuit which generates a first gate-A20 signal and a first CPU RESET signal in response to predetermined commands from a microprocessor;

a peripheral controller which generates a second gate-A20 signal and a second CPU RESET signal in response to an alternate command different from said predetermined commands, said peripheral controller further generating a control signal in response to said alternate command; and a select circuit which receives said first and second gate-A20 signals, said first and second CPU RESET signals, and said control signal, and, responsive to said control signal, selects said first gate-A20 signal and said first CPU RESET signal when said control signal has a first state and selects said second gate-A20 signal and said second CPU RESET signal when said control signal has a second state.

3. A method of generating an alternative gate-A20 signal and an alternative CPU RESET signal in a computer system, wherein said computer system includes an operating system which selectively blocks a conventional gate-A20 signal and a conventional CPU RESET signal, said method comprising the steps of:

generating a selected output command from said microprocessor to a peripheral controller;

receiving said selected output command within said peripheral controller and generating a sequence of output signals from said peripheral controller in response to said selected output command, said sequence of output signals including a control signal having first and second states, said alternative gate-A20 signal and said alternative CPU RESET signal; and gating said conventional gate-A20 signal and said CPU RESET signal as output signals in response to said first state of said control signal, and, in response to said second state of said control signal, gating said alternative gate-A20 signal and said alternative CPU RESET signal as output signals in place of said conventional gate-A20 signal and said conventional CPU RESET signal.

* * * * *

UNITED STATES PATENT AND TRADEMARK OFFICE
CERTIFICATE OF CORRECTION

PATENT NO. : 5,574,943
DATED : November 12, 1996
INVENTOR(S) : Reza E. Daftari

It is certified that error appears in the above-identified patent and that said Letters Patent is hereby corrected as shown below:

On the title page item [54], and column 1, line 2, change "Mircroprocessor-Based" to --Microprocessor-Based--

Signed and Sealed this

Twenty-eighth Day of March, 2000

Attest:

Q. TODD DICKINSON

Attesting Officer     Commissioner of Patents and Trademarks